July 11, 1933.  E. PSIKAL ET AL  1,917,733

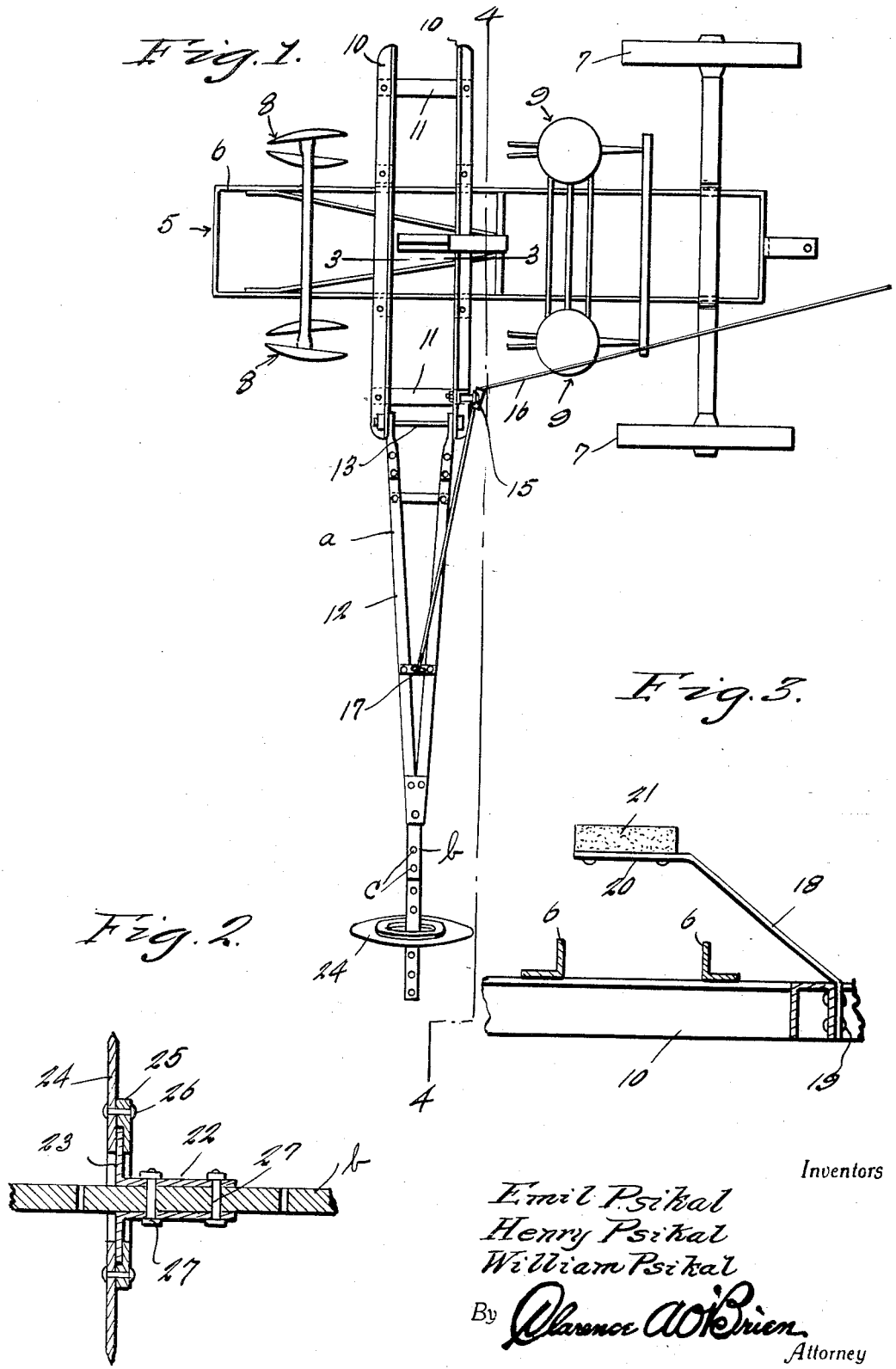

LISTER MARKING ATTACHMENT

Filed July 8, 1932  2 Sheets-Sheet 2

Inventors
Emil Psikal
Henry Psikal
Willam Psikal

By *Clarence A. O'Brien*

Attorney

Patented July 11, 1933

1,917,733

UNITED STATES PATENT OFFICE

EMIL PSIKAL, HENRY PSIKAL, AND WILLIAM PSIKAL, OF DORCHESTER, NEBRASKA

LISTER MARKING ATTACHMENT

Application filed July 8, 1932. Serial No. 621,482.

This invention appertains to new and useful improvements in listers and more particularly to novel means for laying off the rows for planting.

The principal object of this invention is to provide an attachment for listers whereby the rows can be marked for the listers simultaneously with the function of the machine as a planter.

Another important object of the invention is to provide a lister marking attachment for listers which is interchangeable, capable of being changed from one side of the machine to the other.

These and various other important objects and advantages of the invention will become apparent to the reader of the following specification.

In the drawings:—

Figure 1 represents a top plan view of the lister and the novel attachment.

Fig. 2 represents a fragmentary detailed sectional view of the marking disk.

Fig. 3 represents a fragmentary detailed sectional view taken substantially on line 3—3 of Fig. 1.

Figure 4:
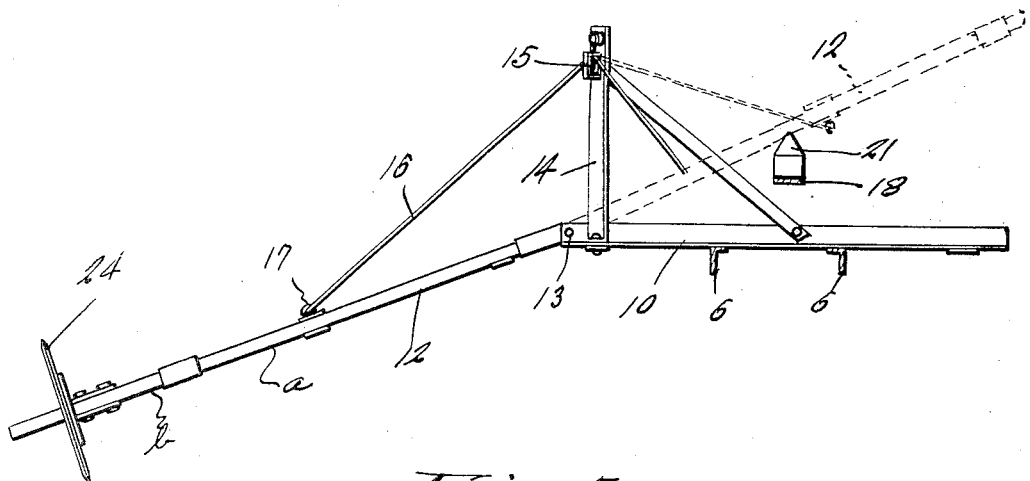
Fig. 4 represents a fragmentary transverse sectional view taken substantially on line 4—4 of Fig. 1.

Refering to the drawings wherein like numerals designate like parts, it can be seen that numeral 5 generally refers to the lister which consists of the frame 6 on the wheels 7—7. Numerals 8—8 generally refer to the planting listers while numerals 9—9 generally refer to the seed depositors or planting units in advance of the listers 8—8.

Suitable means may be associated with the frame 6 whereby this lister can be drawn by a tractor or other power vehicle. In carrying out the present invention, a pair of angle bars 10—10 are disposed transversely across the frame 6 and suitably secured thereto. Cross members 11 connect these bars 10 to maintain the same in a definite spaced relation.

Numeral 12 represents an elongated boom having a V shaped frame $a$ and a bar extension $b$, the latter being provided with a plurality of longitudinally spaced openings $c$ thereon.

Numeral 13 represents a bolt which can pass through openings at the inner end of the frame 12 and extend through openings in the corresponding ends of the bars 10—10 for swingably connecting the said boom 12 to the bars 10—10 at one side or the other of the machine 5.

Numeral 14 represents an upright on one of the bars 10 which has a pulley 15 at its upper end over which the cable 16 is trained. This cable 16 connects to the frame 12 at its intermediate portion thereof, as at 17, and extends forwardly from the machine 5 to a position adjacent the driver's seat on the tractor, (not shown).

Numeral 18 represents a leaf spring anchored as at 19 to the frame 6 and this extends upwardly and horizontally as at 20 to support the cushion block 21 which affords a rest and bumper for the frame 12 when it is swung onto the machine and to the dotted line position shown in Fig. 4. Slidable on the bar extension $b$ is the sleeve 22 having the circumferential flange 23 at one end secured to the disk 24 by the annulus 25 and rivets 26. Bolts 27 pass through the sleeve 22 and through the opening $c$ in the bar extension $b$, and obviously by determining which of the openings $c$ the bolt portions 27 are to be placed through, proper adjustment of the disk 24 can be secured.

Figure 5:
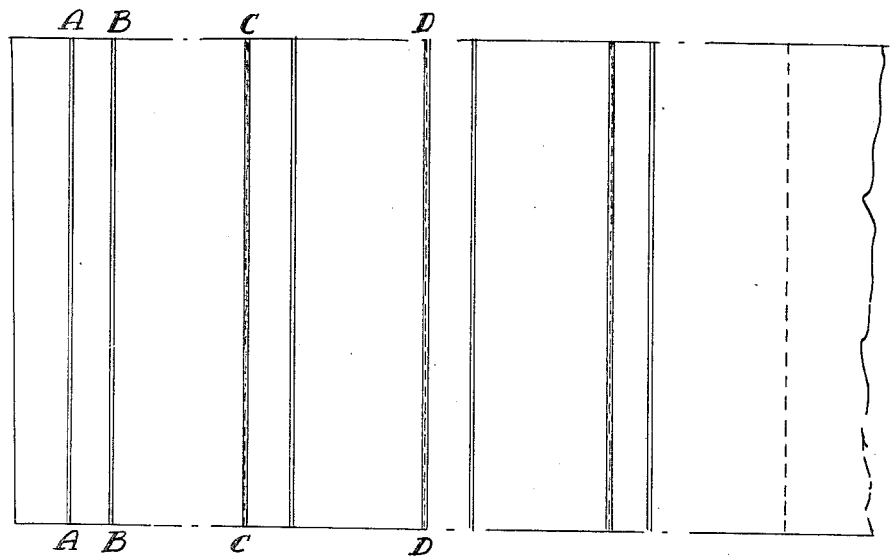
Fig. 5 represents a diagrammatic view disclosing the manner in which the rows are laid off by this marker.

By referring to Fig. 5, it can be seen that in opening up the field two rows A—A and B—B are made by the lister while the marker marks the line C—C, three rows to the right of the row B—B. When the machine has reached one end of the field, it is swung around, and before proceeding along the marked line $c$—$c$, the marker is changed to the opposite side of the machine. In moving along the marked line $c$—$c$, two rows are cut by the lister while the marker marks the line $d$—$d$ along the field, three row spaces to the right of the closest row listered by the machine. When this operation has been performed across the entire width of the field, the machine is then returned and as the space between the rows *b—b* and *c—c* is equivalent to the space required by two rows, the machine is driven along this space without requiring a marker and the same operation of the machine occurs between the rows *d—d* and the nearest row on the left.

He then puts the marker down and proceeds to the end of the field, then goes back to the space between the rows and the marked space until the field is planted. In each back trip the marker is idle.

Obviously this machine is used to save time and also fuel for the tractor and prevents the field from being tramped down, as the same track is used at all times at the end of the field.

While the foregoing specification sets forth the invention in specific terms, it is to be understood that numerous changes in the shape, size and materials may be resorted to without departing from the spirit and scope of the invention as claimed hereinafter.

Having thus described our invention, what we claim as new is:

In combination, a lister including a chassis frame, a cross frame projecting at its end portion beyond the opposite sides of the chassis frame, a boom adapted for interchangeable connection with each end of the cross frame, a cutting disk at the outer end of the boom, means for raising the boom, and a cushioning rest mounted over the cross frame and intermediate the ends thereof for supporting the boom when in retracted position from either end of the cross frame.

In testimony whereof we affix our signatures.

EMIL PSIKAL.
HENRY PSIKAL.
WILLIAM PSIKAL.